Dec. 17, 1968  H. C. FLINT  3,416,839
BACKREST ASSEMBLY
Filed April 26, 1967  2 Sheets-Sheet 1
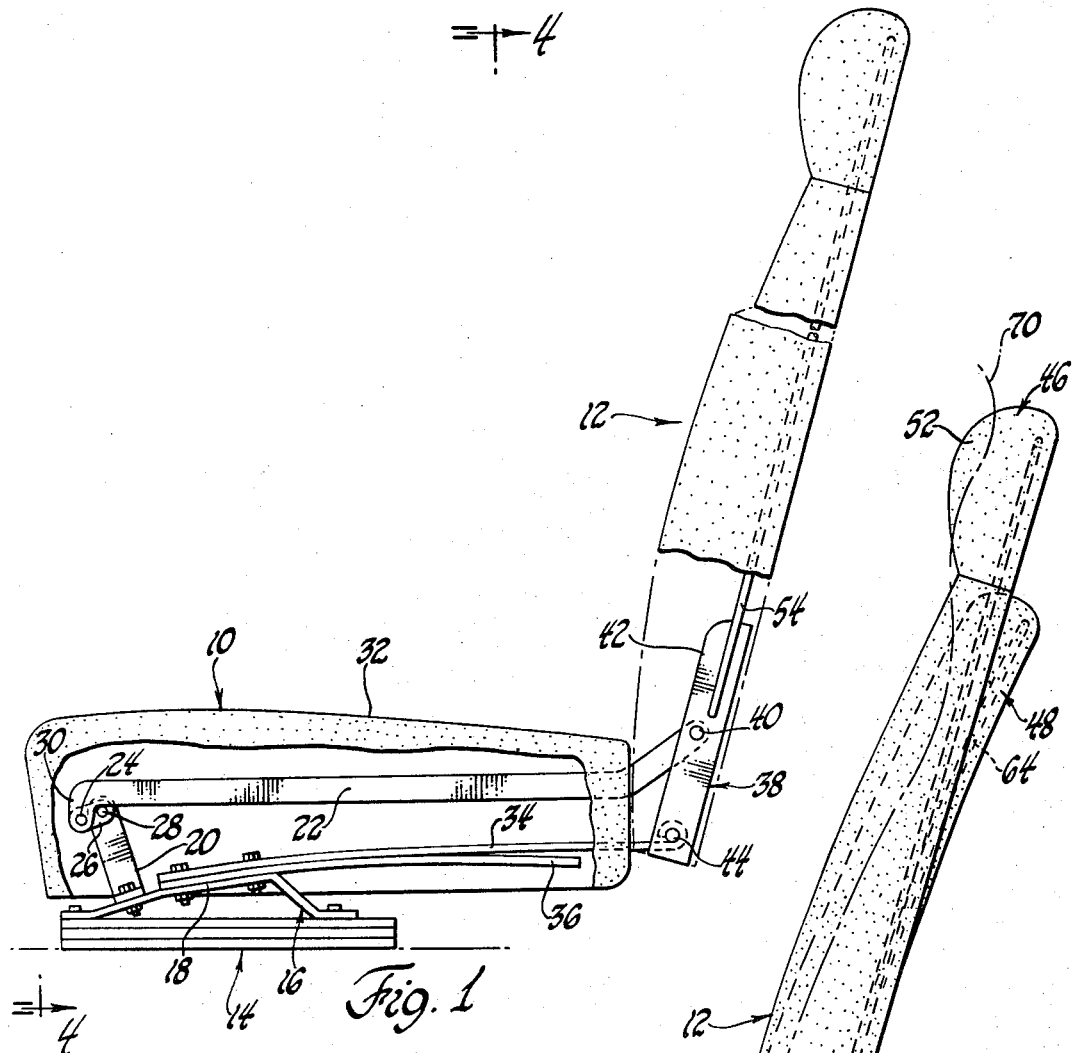
Fig. 1
Fig. 2
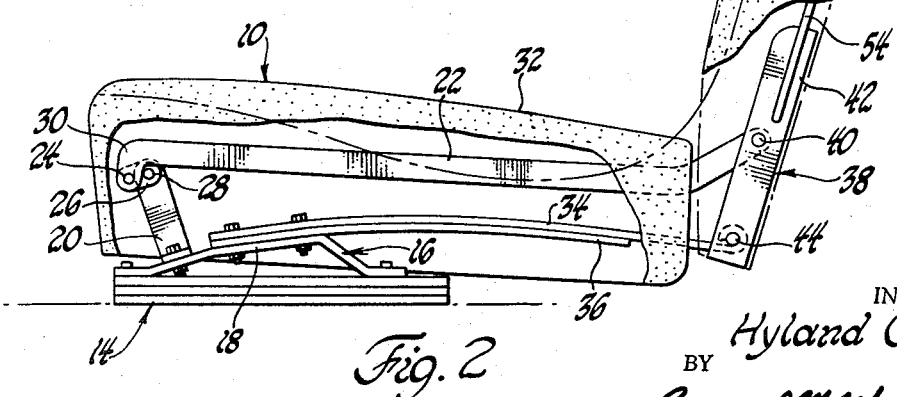
INVENTOR.
Hyland C. Flint
BY
Barnard, McLynn & Rising
ATTORNEYS

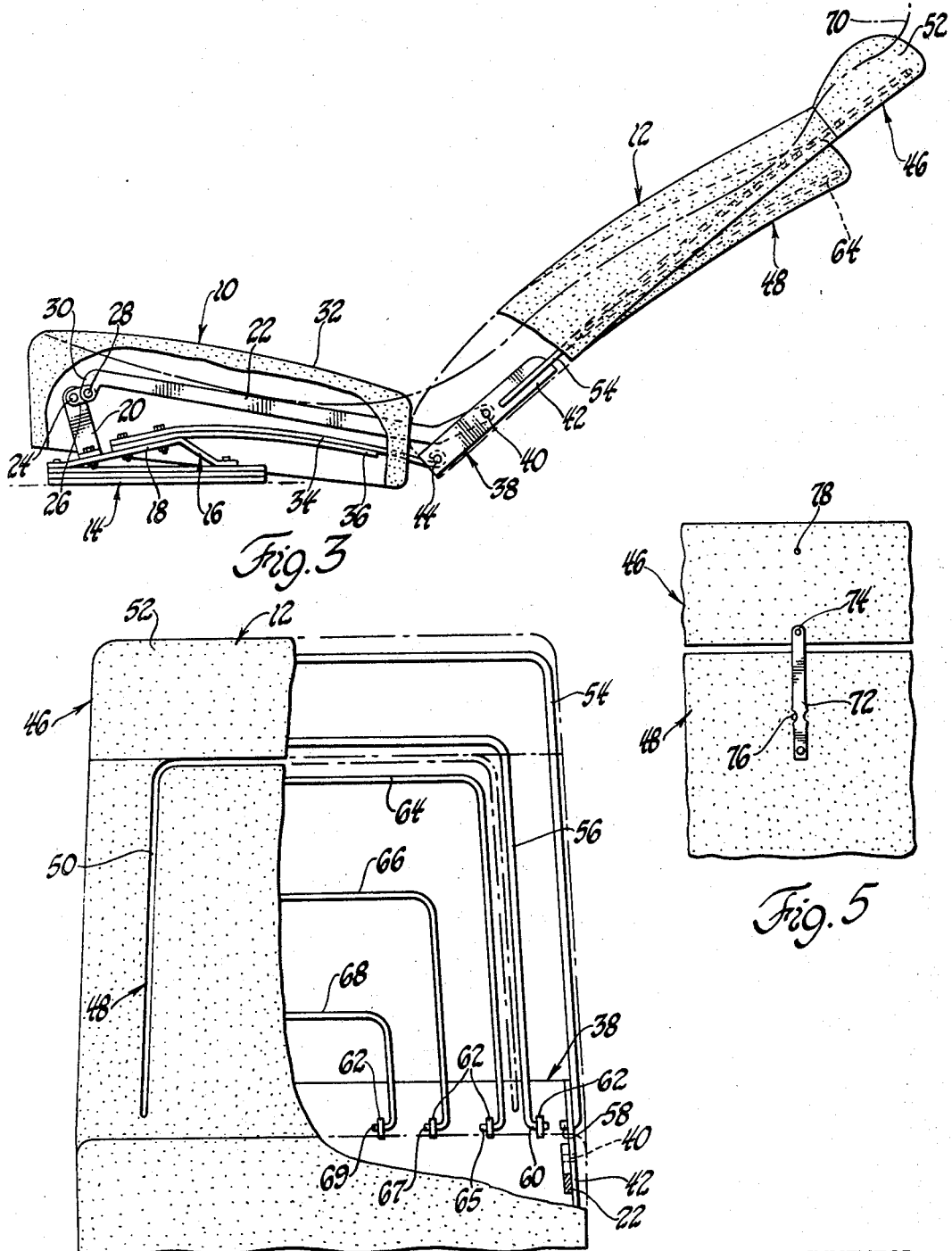

United States Patent Office 3,416,839
Patented Dec. 17, 1968

3,416,839
BACKREST ASSEMBLY
Hyland C. Flint, 3551 Walnut Lake Road,
Orchard Lake, Mich. 48033
Filed Apr. 26, 1967, Ser. No. 638,686
15 Claims. (Cl. 297—396)

ABSTRACT OF THE DISCLOSURE

A backrest assembly for a seat structure, either reclining or fixed, in which the back assembly is in two parts. An outer peripheral part includes a headrest portion, and an inner part is so arranged as to support the major weight of the back of the occupant. U-shaped spring wire members in both parts, being of varying degrees of resilience, permit the inner part to deflect rearwardly at a greater rate than the outer part, so that the occupant's head contacts the headrest portion.

---

This invention relates to seat structures, and more particularly to an improved backrest assembly for seat structures in which a portion of the assembly provides a headrest portion properly positioned relative to the occupant in all positions of the back assembly relative to the seat portion.

In the design and manufacture of seat structures, it is becoming more and more desirable to provide an occupant headrest for ease and comfort of the occupant in numerous positions of a backrest relative to a seat portion, and to provide greater safety and energy absorption in certain types of seating use. In the transportation industry, where seating is used in automotive vehicles, trucks, trains, busses, and planes it is becoming more and more popular to provide reclining type seat structures where the backrest assembly is allowed to change its angularity relative to the seat portion, thus permitting the occupant to lean back a considerable distance. In the furniture industry, reclining chairs are well known, permitting a rearward tilt of the seat back for a more comfortable occupant position under certain conditions. In either usage of reclining seat structures, it is important to have a headrest structure at the upper portion of the backrest assembly to support the neck and/or head of the occupant, such headrest structure being such as to both support the head and provide a degree of energy absorption for safety purposes should a vehicle be involved in an accident or the like.

The present approach to providing head and neck support in seating structures, and particularly in the transportation industry, has been to provide some sort of disappearing headrest, normally being structures that are actuated by complicated and cumbersome linkage and lever arrangements to raise the headrest when the back assembly is reclined. Otherwise, a fixed headrest structure is provided which is only usable in a limited range of angularity of the backrest relative to the seat, and thus, in many positions, the headrest is ineffective, either as a support or as a safety feature. In the furniture industry, it is common to provide a fixed headrest at the upper part of the back assembly which has the same problems as in the transportation industry wherein the headrest is only available as a support in a limited portion of the over-all range of reclinability of the backrest relative to the seat portion. This leads to discomfort on the part of the occupant, either in an unnatural rearward tilt of the head to engage the headrest in many of the reclinable positions, or in a lack of any head or neck support as a result of the configuration of the occupant compared to the configuration of the backrest assembly.

The device in which this invention is embodied comprises, generally, a backrest assembly composed of two portions, one of which is an outer U-shaped portion wherein the transverse part forms a head or neck supporting member, and an intermediate portion disposed within the U-shaped portion, independently deflectable rearwardly relative to the outer U-shaped portion. The backrest assembly is so designed that the shoulders and upper back of the occupant contact the intermediate portion and, under normal upright seating conditions, will deflect the intermediate portion rearwardly to a greater extent than the outer peripheral portion. Thus, the natural seating posture of the occupant brings his head, or neck, in contact with the transverse part of the outer peripheral portion. Upon reclining the seat back rearwardly relative to the seat structure, the intermediate portion may deflect still further, and to a greater extent than the outer peripheral portion, maintaining the normal configuration of the occupant's back and head location in the reclined position.

Such a backrest assembly is easily manufactured and produced, and readily adaptable to many existing seat structures. The backrest assembly provides a considerable safety factor, particularly when the seating structures are used in transportation-type seating, assuring fully energy absorption support for the head or neck of the seat occupant, taking up sudden jolts, bumps and the like which might occur. At the same time, maximum comfort is obtained and the occupant's normal seating posture is retained relative to the headrest or neck support, whether the seat structure is used in transportation seating or furniture seating of the reclining type. It is unnecessary for the occupant to operate levers, pushbuttons or otherwise manually adjust the back assembly in order to provide headrest or neck support. The loaded portions of the backrest assembly adjust automatically to the occupant in both upright and reclined positions, and the back assembly is easily upholstered and trimmed to provide an aesthetically appealing structure without inordinate expense or consumption of time in so doing.

These and other advantages will become more apparent from the following description and drawings in which:

FIGURE 1 is an elevational view, with parts broken away and in section of a seat structure utilizing the backrest assembly and showing the backrest assembly in an unloaded, upright position.

FIGURE 2 is an elevational view, with parts broken away and in section, of the seat structure illustrated in FIGURE 1, showing the backrest assembly in an upright and occupied position.

FIGURE 3 is an elevational view, with parts broken away and in section, of the structure illustrated in FIGURE 1, showing the backrest assembly in an occupied and reclined position.

FIGURE 4 is a front view, with parts broken away and in section, of the backrest assembly shown in FIGURES 1 through 3 and illustrating the interior parts.

FIGURE 5 is a view of a modification of the seat structure illustrated in FIGURES 1 through 4, illustrating a latching means for the backrest assembly.

Referring more particularly to the drawings, FIGURE 1 best illustrates the over-all seat structure in an unoccupied and upright position. It should be noted at the outset that the seat portion of the over-all seat structure may be of any suitable design and is shown for convenience to be of a type illustrated and described in the co-pending United States application, Ser. No. 622,355, filed in the name of Hyland C. Flint on Mar. 10, 1967.

As illustrated in FIGURE 1, the seat structure is shown to include a seat portion, indicated generally by the numeral 10, extending upwardly and rearwardly from which is a back portion, illustrated generally by the numeral 12. Seat portion 10 may be mounted on any suitable support, indicated generally by the numeral 14. Support 14 may be the usual seat track assembly in an automotive vehicle or may be some sort of leg assembly, should the seat structure be used as an article of furniture. Mounted on the support structure 14 is a mounting plate, indicated generally by the numeral 16, which includes an upwardly and rearwardly directed ramp portion 18. A bracket member 20, extending upwardly from the mounting plate 16, supports a rearwardly extending support member 22, pivotally mounted as at 24 to a short swing link 26, the swing link 26 being pivotally attached to the bracket 20 as at 28. Support member 22 includes a forward hook portion 30, and rests upon the pivot connection 28 in the upright position so that the rearward end of the support member 22 may pivot downwardly about the pivot connection 28. The support member 22 may receive any suitable cushioning supporting means (not shown), and the cushioning and trim 32 are mounted thereon.

Extending upwardly and rearwardly from the mounting plate 16, and secured on the ramp 18, is a leaf supporting spring 34 and a secondary leaf supporting spring 36. As primary support spring 34 is deflected under load, and after a predetermined amount of deflection, the secondary supporting spring 36 is contacted for additional spring support.

Rearwardly of the seat portion 10 is a transverse member, indicated generally by the numeral 38, which extends transversely of the seat structure. The rearward end of the seat support member 22 is pivotally secured, as at 40, in a forwardly directed flange 42 of the transverse mounting member 38. Similarly, the rearward end of primary leaf spring 34 is pivotally supported as at 44 in the flange 42, the spring being conveniently formed in an eye at its rearward end to receive the pivot.

It will be apparent that as the seat 10 is deflected downwardly under load, the seat support members 22 will pivot about the forward pivot point 28, and the respective pivot mountings 40 and 44 in the rearward mounting plate will cause the rearward mounting plate to deflect downwardly without substantial change in angularity relative to the support 14, the ground, or a vertical line. The remainder of the backrest assembly, as will become hereinafter more apparent, is secured to the transverse mounting plate 38 and moves downwardly therewith under load in the same manner.

Should it become desirable to recline the back structure 12 relative to the seat 10, the supporting members 22 may be shifted rearwardly around the pivot 28 to a position illustrated in FIGURE 3, the rearward movement of the support rear pivot 40 relative to the spring support rear pivot 44 causing the backrest assembly 12 to assume a position such as shown in FIGURE 3.

Referring next to FIGURE 4, the construction of the backrest assembly is best illustrated. As shown, backrest assembly 12 includes an outer U-shaped peripheral portion, indicated generally by the numeral 46, and an inner portion, indicated generally by the numeral 48, the two portions having separate trim and upholstery meeting along a U-shaped line or space as indicated at 50. The upper part 52 of the outer peripheral portion 46 serves as a neckrest or headrest for the occupant and may be of any suitable configuration as determined by the upholstery and trim means. The intermediate portion 48, as will be hereinafter more particularly described, is movable independently of the outer peripheral portion 46 without hindrance from the trim and upholstery separated along the space 50.

The outer peripheral portion 46 is shown to include a pair of U-shaped spring wire members 54 and 56, the ends of the legs of which are suitably secured in the transverse mounting plate 38. Member 54 may have inwardly turned ends 58, suitably received and secured in the forwardly directed flange 42 of the transverse mounting plate 38, and the ends of the legs 60 of the wire member 56 may be secured to the mounting plate 38 as by clips 62. Spring wire members 54 and 56 have a particular degree of resilience such that upon reclining or loading of the backrest assembly the peripheral portion will deflect rearwardly a sufficient amount to support the head or neck of the occupant to the desired degree.

Intermediate portion 48 of the backrest assembly 12 is shown to include a plurality of U-shaped spring wire members 64, 66 and 68, such members extending into the area enclosed by the outer peripheral portion 46 to varying degrees. The ends of the legs of spring wire members 64, 66 and 68 are suitably secured on the transverse mounting plate 38, as by inwardly turned portions 65, 67 and 69, and mounted by means of clips 62 as indicated in FIGURE 4. Spring wire members 64, 66 and 68 are designed to be more resilient than the outer spring wires 54 and 56 so as to deflect rearwardly to a greater degree under the occupant load. Intermediate portion 48 is also designed so as to support the back and shoulders of the occupant so that as rearward deflection or reclining takes place, the best seating posture is maintained.

Spring wires 54 and 56, as well as spring wires 64, 66 and 68, support the upholstery, cushioning and trim in any suitable manner and to any suitable degree, and so long as the two portions 46 and 48 are independently trimmed at least to the extent of the moveable or deflectable portions thereof, there is no hindrance to the movement of portion 48 relative to portion 46.

Reference to FIGURE 2 will indicate the location of the various parts when the seat structure is in an upright position, and occupied or loaded by an occupant whose general rearward contour is indicated by the dashed and dotted lines 70. It can be seen that the intermediate or inner portion 48 of the backrest assembly 12 is deflected rearwardly to a greater degree than the outer peripheral portion 46, which supports at its upper transverse portion 52 the head or neck of the occupant. The occupant's shoulders, projecting rearwardly to a greater degree than the rearward portion of the head, cause the upper edge of the intermediate portion 48 to deflect rearwardly to a greater extent, as illustrated in FIGURE 2.

Referring next to FIGURE 3, the seat structure is illustrated in a reclined position with the intermediate backrest portion 48 deflected still further rearwardly than the outer peripheral portion 46, supporting the head and neck of the occupant whose contour line is indicated by dashed and dotted lines 70. Head and neck support 52 of the outer peripheral portion 46 is properly positioned in accordance with the normal seating contour of the occupant.

Referring next to FIGURE 5, a portion of a modification of the seat structure is illustrated. Where it may be desirable to lock the two portions 46 and 48 of the seat structure together, so that there is no independent movement, a latching device may be provided. A latch arm 72 is pivotally secured at 74 in the upper rearward portion of the peripheral part 46, and extends downwardly to a catch or stop member 76, suitably mounted in the inner or intermediate backrest portion 48. With the latch member 72 in such position, it will be apparent that independent movement of the inner portion 48 is blocked and the inner portion 48 and the portion 46 must move together. Should it again be desirable to provide independent movement, the latch member 72 may be pivoted upwardly to engagement with a stop or catch 78, suitably mounted in the peripheral backrest portion 46, and the inner portion 48 will then be completely separate from the outer peripheral portion 46.

Thus, a backrest assembly is provided for a seat structure that provides proper head and neck support for the occupant in all positions of the seat back relative to the seat portion. The independent movement of the inner backrest portion relative to the outer peripheral backrest portion permits the shoulders of the occupant to assume a more comfortable position relative to the head than is normally present in available seating structures. At the same time, when the backrest assembly is utilized in transportation type seating, energy absorption support is provided for the head and/or neck of the occupant for improved safety in the overall seat structure. The backrest assembly is relatively simple to manufacture and produce, and can be easily adapted to existing designs in seating, whether such designs be in the area of transportation usage or furniture usage.

Numerous modifications and changes to the structure hereinbefore described and shown will occur to those having skill in the art, after having had reference to the description and drawings. However, it is not intended to limit the scope of the invention by the foregoing description and drawings, but by the scope of the appended claims in which the embodiments of the invention in which an exclusive property or privilege is claimed are defined as follows.

I claim:

1. A back rest assembly for a seat structure comprising: a first portion; a second portion disposed within said first portion and being generally co-planar therewith under no-load conditions; and means for moving said second portion independently of said first portion for greater rearward deflection under load.

2. The back rest assembly set forth in claim 1 wherein said first portion is of U-shaped configuration having upright parts and a lateral part.

3. The back rest assembly set forth in claim 2 wherein said lateral part of said first portion is a head rest.

4. The backrest assembly set forth in claim 1 wherein said first portion includes a plurality of U-shaped members having a degree of resilience.

5. The back rest assembly set forth in claim 4 wherein said second portion includes a plurality of U-shaped members having a greater degree of resilience than said U-shaped members in said first portion.

6. The back rest assembly set forth in claim 5 and further including a transverse member adapted to be secured to the seat of said seat structure, said transverse member supporting said U-shaped members in said first portion and said U-shaped members in said second portion.

7. The back rest assembly set forth in claim 5 wherein said U-shaped members in said first portion are formed of spring wire, and said U-shaped members in said second portion are formed of spring wire of greater resilience than said U-shaped members in said first portion.

8. The backrest assembly set forth in claim 1 and further including latch means secured to one of said portions and engageable with the other of said portions for preventing independent movement of said second portion relative to said first portion.

9. A backrest assembly for a seat structure comprising: first U-shaped means; second U-shaped means disposed within said first U-shaped means and having a greater degree of resilience than said first U-shaped means, said second U-shaped means being movable rearwardly under load a greater amount than said first U-shaped means; and means for mounting said first and second U-shaped means on the seat portion of said seat structure.

10. The backrest assembly set forth in claim 9 wherein said first U-shaped means includes a spring wire member secured at the ends of the legs thereof to said mounting means and extending upwardly therefrom.

11. The backrest assembly set forth in claim 10 wherein said second U-shaped means includes a spring wire member of lesser spring rate than said spring wire member in said first U-shaped means, said spring wire member in said second U-shaped means having the ends of the legs thereof secured to said mounting means and extending upwardly therefrom within said spring wire member in said first U-shaped means.

12. The backrest assembly set forth in claim 9 and further including upholstery and trim means supported on said first and second U-shaped means, said upholstery and trim means on said second U-shaped means being separate from said upholstery and trim means on said first U-shaped means.

13. The backrest assembly set forth in claim 12 wherein the cross portion of said first U-shaped means and said upholstery and trim means thereon constitute a headrest for the occupant of said seat structure.

14. The backrest assembly set forth in claim 13 wherein said second U-shaped means and the upholstery and trim means thereon constitute a support for the back and shoulders of the occupant of said seat structure.

15. The backrest assembly set forth in claim 12 and further including latch means secured to one of said U-shaped means and selectively engageable with the other of said U-shaped means to prevent independent movement of said second U-shaped means relative to said first U-shaped means where engaged and to permit such independent movement where disengaged.

References Cited

UNITED STATES PATENTS

| 2,784,771 | 3/1957 | Hinderickson | 297—396 |
| 2,843,183 | 7/1958 | Luckhardt | 297—396 |
| 3,329,463 | 7/1967 | Zimmermann | 297—243 |
| 3,332,719 | 7/1967 | Flint | 297—309 |

CASMIR A. NUNBERG, *Primary Examiner.*

U.S. Cl. X.R.

297—456, 309